United States Patent
Sridharan et al.

(10) Patent No.: US 12,309,095 B2
(45) Date of Patent: May 20, 2025

(54) DYNAMICALLY ADDING ADDITIONAL DEMODULATION REFERENCE SIGNAL (A-DMRS) FOR PUSCH

(71) Applicant: QUALCOMM Incorporated, San Diego, CA (US)

(72) Inventors: Gokul Sridharan, Sunnyvale, CA (US); Hung Dinh Ly, San Diego, CA (US); Alexandros Manolakos, Escondido, CA (US); Wanshi Chen, San Diego, CA (US); Krishna Kiran Mukkavilli, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/905,396

(22) PCT Filed: May 13, 2021

(86) PCT No.: PCT/US2021/032285
§ 371 (c)(1),
(2) Date: Aug. 31, 2022

(87) PCT Pub. No.: WO2021/231753
PCT Pub. Date: Nov. 18, 2021

(65) Prior Publication Data
US 2023/0107305 A1    Apr. 6, 2023

(30) Foreign Application Priority Data
May 13, 2020    (GR) ............................. 20200100253

(51) Int. Cl.
*H04L 5/00*    (2006.01)

(52) U.S. Cl.
CPC .......... *H04L 5/0051* (2013.01); *H04L 5/0091* (2013.01)

(58) Field of Classification Search
CPC ... H04L 5/0051; H04L 5/0091; H04L 5/0037; H04L 5/0064
See application file for complete search history.

(56) References Cited

U.S. PATENT DOCUMENTS

| | | | |
|---|---|---|---|
| 10,897,755 B2* | 1/2021 | Shin | ...................... H04L 5/0051 |
| 2018/0167932 A1* | 6/2018 | Papasakellariou | .... H04L 1/1887 |

(Continued)

FOREIGN PATENT DOCUMENTS

| | | |
|---|---|---|
| WO | 2017132841 A1 | 8/2017 |
| WO | 2018128453 A1 | 7/2018 |

(Continued)

OTHER PUBLICATIONS

International Search Report and Written Opinion issued to PCT/US2021/032285 on Sep. 14, 2021.

*Primary Examiner* — Jackie Zuniga Abad
*Assistant Examiner* — Latresa A McCallum
(74) *Attorney, Agent, or Firm* — Patterson & Sheridan LLP

(57) ABSTRACT

Certain aspects of the present disclosure provide techniques for wireless communication by detecting at least one condition related to a channel between a network entity and a user equipment (UE); triggering the UE to transmit additional demodulation reference signal (A-DMRS) for a physical uplink shared channel (PUSCH) transmission, relative to DMRS indicated in a current PUSCH DMRS configuration; and monitoring for a PUSCH transmission from the UE including the A-DMRS.

29 Claims, 13 Drawing Sheets

(56) References Cited

U.S. PATENT DOCUMENTS

| | | | |
|---|---|---|---|
| 2019/0349023 A1 | 11/2019 | Ge et al. | |
| 2019/0369023 A1 | 12/2019 | Humfeld et al. | |
| 2020/0021413 A1* | 1/2020 | Park | H04B 7/0469 |
| 2020/0022176 A1* | 1/2020 | Osawa | H04L 27/2646 |
| 2020/0120649 A1* | 4/2020 | Nimbalker | H04W 74/02 |
| 2020/0280465 A1* | 9/2020 | Kim | H04L 5/0007 |
| 2020/0328870 A1* | 10/2020 | Kim | H04W 56/001 |
| 2020/0403748 A1* | 12/2020 | Yokomakura | H04L 5/0048 |
| 2021/0007138 A1* | 1/2021 | Xu | H04L 27/2607 |
| 2022/0086872 A1* | 3/2022 | Shimezawa | H04W 72/1268 |

FOREIGN PATENT DOCUMENTS

| | | | | |
|---|---|---|---|---|
| WO | WO-2020145270 A1 * | 7/2020 | | H04L 1/189 |
| WO | WO-2021133374 A1 * | 7/2021 | | H04B 17/318 |
| WO | WO-2021178788 A1 * | 9/2021 | | H04L 5/0012 |

* cited by examiner

PUSCH-Config Information Element

```
-- ASN1START
-- TAG-PUSCH-CONFIG-START
PUSCH-Config ::=            SEQUENCE {
    dataScramblingIdentityPUSCH     INTEGER (0..1023)                                              OPTIONAL,   -- Need S
    txConfig                        ENUMERATED {codebook, nonCodebook}                             OPTIONAL,   -- Need S
    dmrs-UplinkForPUSCH-MappingTypeA SetupRelease { DMRS-UplinkConfig }                            OPTIONAL,   -- Need M
    dmrs-UplinkForPUSCH-MappingTypeB SetupRelease { DMRS-UplinkConfig }                            OPTIONAL,   -- Need M
    pusch-PowerControl              PUSCH-PowerControl                                             OPTIONAL,   -- Need M
    frequencyHopping                ENUMERATED {intraSlot, interSlot}                              OPTIONAL,   -- Need S
    frequencyHoppingOffsetLists     SEQUENCE (SIZE (1..4)) OF INTEGER (1..maxNrofPhysicalResourceBlocks-1) OPTIONAL, -- Need M
    resourceAllocation              ENUMERATED { resourceAllocationType0, resourceAllocationType1, dynamicSwitch},
    pusch-TimeDomainAllocationList  SetupRelease { PUSCH-TimeDomainResourceAllocationList}         OPTIONAL,   -- Need M
    pusch-AggregationFactor         ENUMERATED { n2, n4, n8 }                                      OPTIONAL,   -- Need S
    mcs-Table                       ENUMERATED { qam256, qam64LowSE}                               OPTIONAL,   -- Need S
    mcs-TableTransformPrecoder      ENUMERATED { qam256, qam64LowSE}                               OPTIONAL,   -- Need S
    transformPrecoder               ENUMERATED { enabled, disabled}                                OPTIONAL,   -- Need S
    codebookSubset                  ENUMERATED { fullyAndPartialAndNonCoherent, partialAndNonCoherent, nonCoherent}
                                                                                                   OPTIONAL,   -- Cond codebookBased
    maxRank                         INTEGER (1..4)                                                 OPTIONAL,   -- Cond codebookBased
    rbg-Size                        ENUMERATED { config2}                                          OPTIONAL,   -- Need S
    uci-OnPUSCH                     SetupRelease { UCI-OnPUSCH}                                    OPTIONAL,   -- Need M
    tp-pi2BPSK                      ENUMERATED {enabled}                                           OPTIONAL,   -- Need S
    ...
}

UCI-OnPUSCH ::=             SEQUENCE {
    betaOffsets                     CHOICE {
        dynamic                         SEQUENCE (SIZE (4)) OF BetaOffsets,
        semiStatic                      BetaOffsets
    }                                                                                              OPTIONAL,   -- Need M
    scaling                         ENUMERATED { f0p5, f0p65, f0p8, f1 }
}
```

RECEIVE, FROM A NETWORK ENTITY, SIGNALING THAT TRIGGERS A USER EQUIPMENT (UE) TO TRANSMIT ADDITIONAL DEMODULATION REFERENCE SIGNAL (A-DRMS) FOR A PHYSICAL UPLINK SHARED CHANNEL (PUSCH) TRANSMISSION, RELATIVE TO DMRS INDICATED IN A CURRENT PUSCH DMRS CONFIGURATION

704

TRANSMIT AT LEAST ONE PUSCH INCLUDING THE A-DMRS

FIG. 7

Baseline: 10 PUSCH + 2 DMRS

10 PUSCH + 2 DMRS + 1 A-DMRS

DYNAMICALLY ADDING ADDITIONAL DEMODULATION REFERENCE SIGNAL (A-DMRS) FOR PUSCH

CROSS-REFERENCE TO RELATED APPLICATION

This application is a national stage application under 35 U.S.C. 371 of PCT/US2021/032285, filed May 13, 2021, which claims benefit of priority to Greek Patent Application No. 20200100253, filed May 13, 2020, which is assigned to the assignee hereof, the contents of each of which are hereby incorporated by reference in their entireties.

BACKGROUND

Field of the Disclosure

Aspects of the present disclosure relate to wireless communications, and more particularly, to dynamically triggering additional demodulation reference signals (A-DMRS) in physical uplink shared channel (PUSCH) transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved device-to-device communications in a wireless network.

Certain aspects of this disclosure provide a method for wireless communications by a user equipment (UE). The method generally includes receiving, from a network entity, signaling that triggers the UE to transmit additional demodulation reference signal (A-DMRS) for a physical uplink shared channel (PUSCH) transmission, relative to DMRS indicated in a current PUSCH DMRS configuration; and transmitting at least one PUSCH including the A-DMRS.

Certain aspects of this disclosure provide a method for wireless communications by a network entity. The method generally includes detecting at least one condition related to a channel between the network entity and a user equipment (UE); triggering, based on the detection, the UE to transmit additional demodulation reference signal (A-DMRS) for a physical uplink shared channel (PUSCH) transmission, relative to DMRS indicated in a current PUSCH DMRS configuration; and monitoring for a PUSCH transmission from the UE including the A-DMRS.

Certain aspects of this disclosure provides an apparatus for wireless communications by a user equipment (UE). The apparatus generally includes a memory; and at least one processor coupled to the memory. The at least one processor is configured to: receive, from a network entity, signaling that triggers the UE to transmit additional demodulation reference signal (A-DMRS) for a physical uplink shared channel (PUSCH) transmission, relative to DMRS indicated in a current PUSCH DMRS configuration; and transmit at least one PUSCH including the A-DMRS.

Certain aspects of this disclosure provides an apparatus for wireless communications by a network entity. The apparatus generally includes a memory; and at least one processor coupled to the memory. The at least one processor is configured to: detect at least one condition related to a channel between the network entity and a user equipment (UE). The at least one processor is further configured to trigger, based on the detection, the UE to transmit additional demodulation reference signal (A-DMRS) for a physical uplink shared channel (PUSCH) transmission, relative to DMRS indicated in a current PUSCH DMRS configuration. The at least one processor is configured to monitor for a PUSCH transmission from the UE including the A-DMRS.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates an example PUSCH configuration information element in accordance with some aspects of the present disclosure.

FIG. 7 illustrates example operations for wireless communications by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
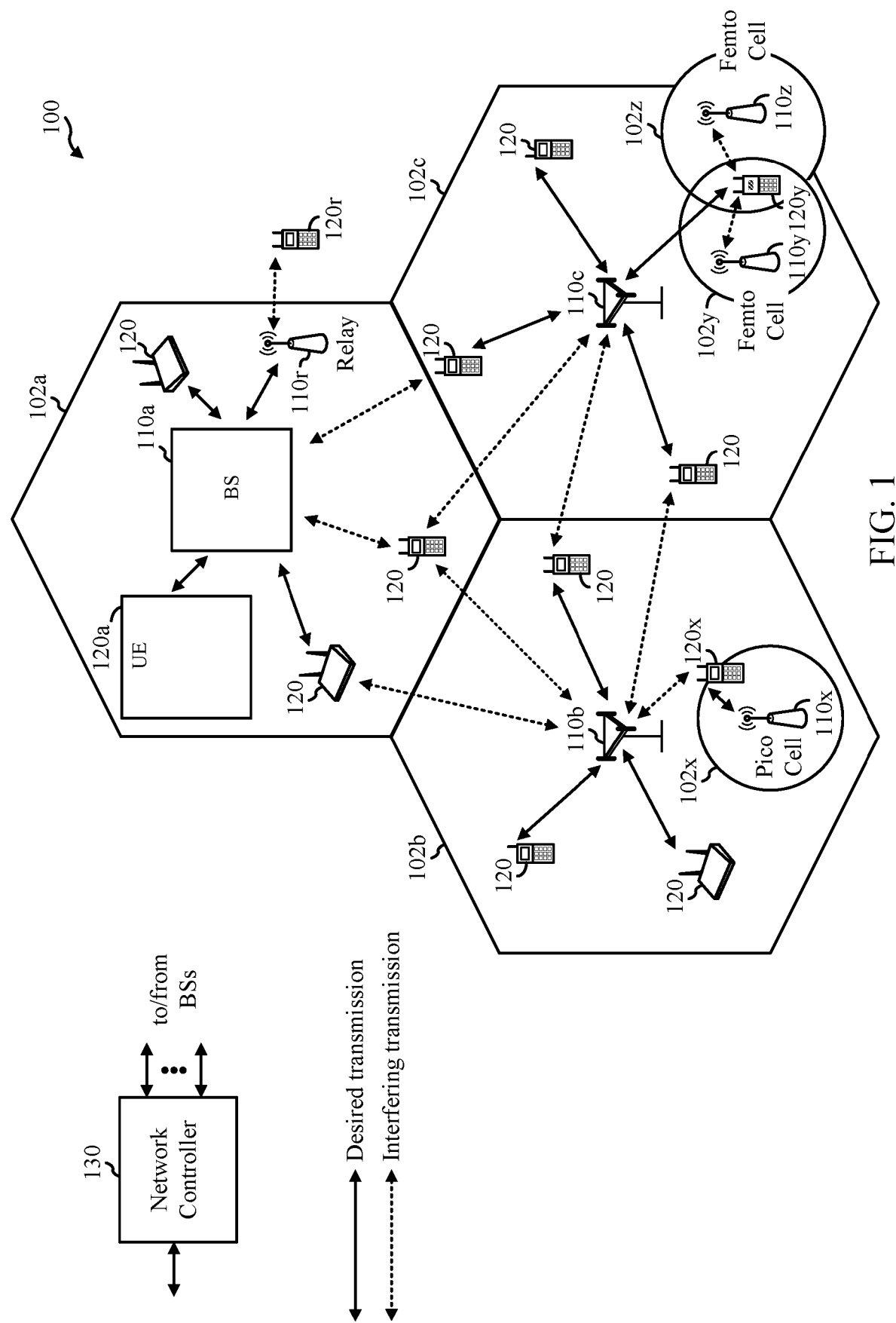
FIG. 1 is a block diagram conceptually illustrating an example telecommunications system, in accordance with certain aspects of the present disclosure.

Aspects of the present disclosure provide apparatus, methods, processing systems, and computer readable mediums for dynamically triggering additional demodulation reference signals (A-DMRS) for a physical uplink shared channel (PUSCH) transmission. The ability to dynamically trigger A-DMRS may allow for substantially improved flexibility, adapting the use of resources for changing channel conditions.

Thus, the A-DMRS mechanism disclosed herein may address the issues of DMRS, which is configured using radio resource control (RRC) and cannot change in response to changes of wireless conditions. For example, when a UE goes into a deep fade, additional resources for DMRS may need be set aside. The change for setting additional resources may be at a time scale much shorter than a normal RRC reconfiguration. Therefore, the disclosed A-DMRS allows a more dynamic mechanism to add additional DMRS to existing DMRS configurations to adapt quickly to changes in wireless conditions.

The A-DMRS may also warrant a different type of DMRS, such as, for example, to provide a different sequence to alleviate peak-to-average-power ratio (PAPR) issues, to aid power-delay-profile measurement by spanning a larger bandwidth, or to occupy frequency domain resources with a different pattern.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, one or more UEs 120a of FIG. 1 may be configured to perform operations described below with reference to FIG. 7 to transmit at least one physical uplink shared channel (PUSCH) including an additional-demodulation reference signal (A-DMRS). Similarly, a base station 110 may be configured to perform operations 600 of FIG. 6 to trigger the UE to transmit the A-DMRS for a PUSCH transmission.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
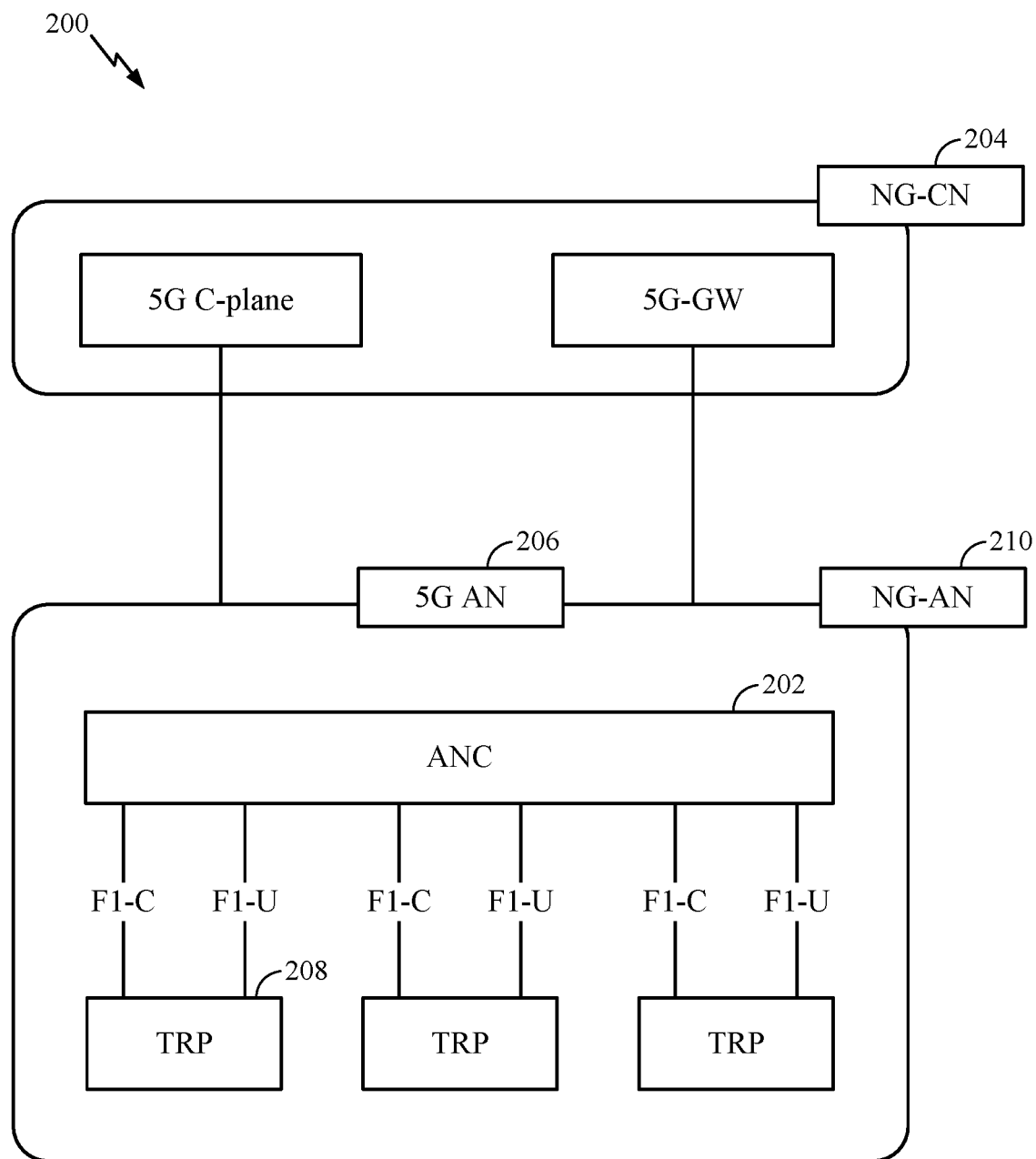
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
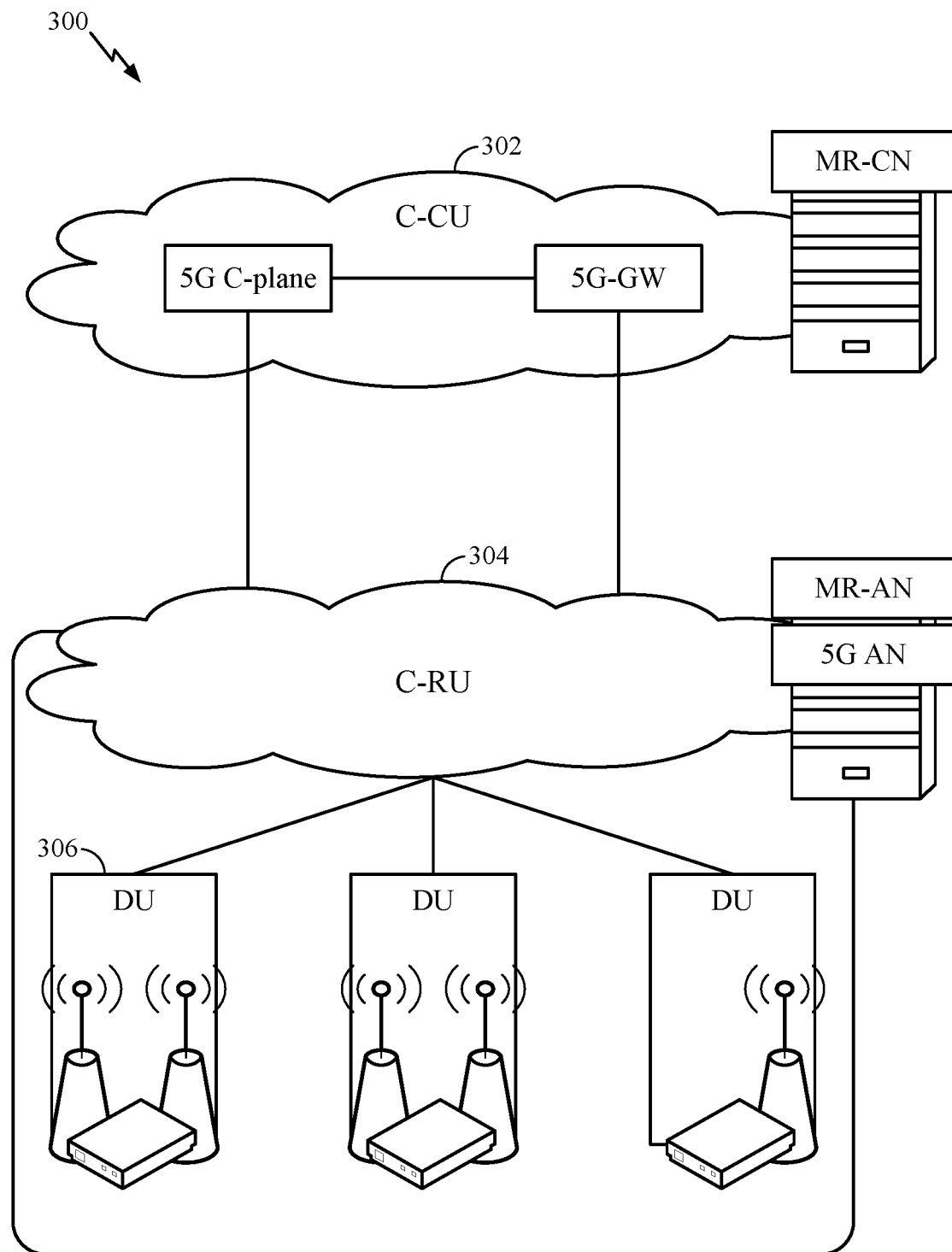
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
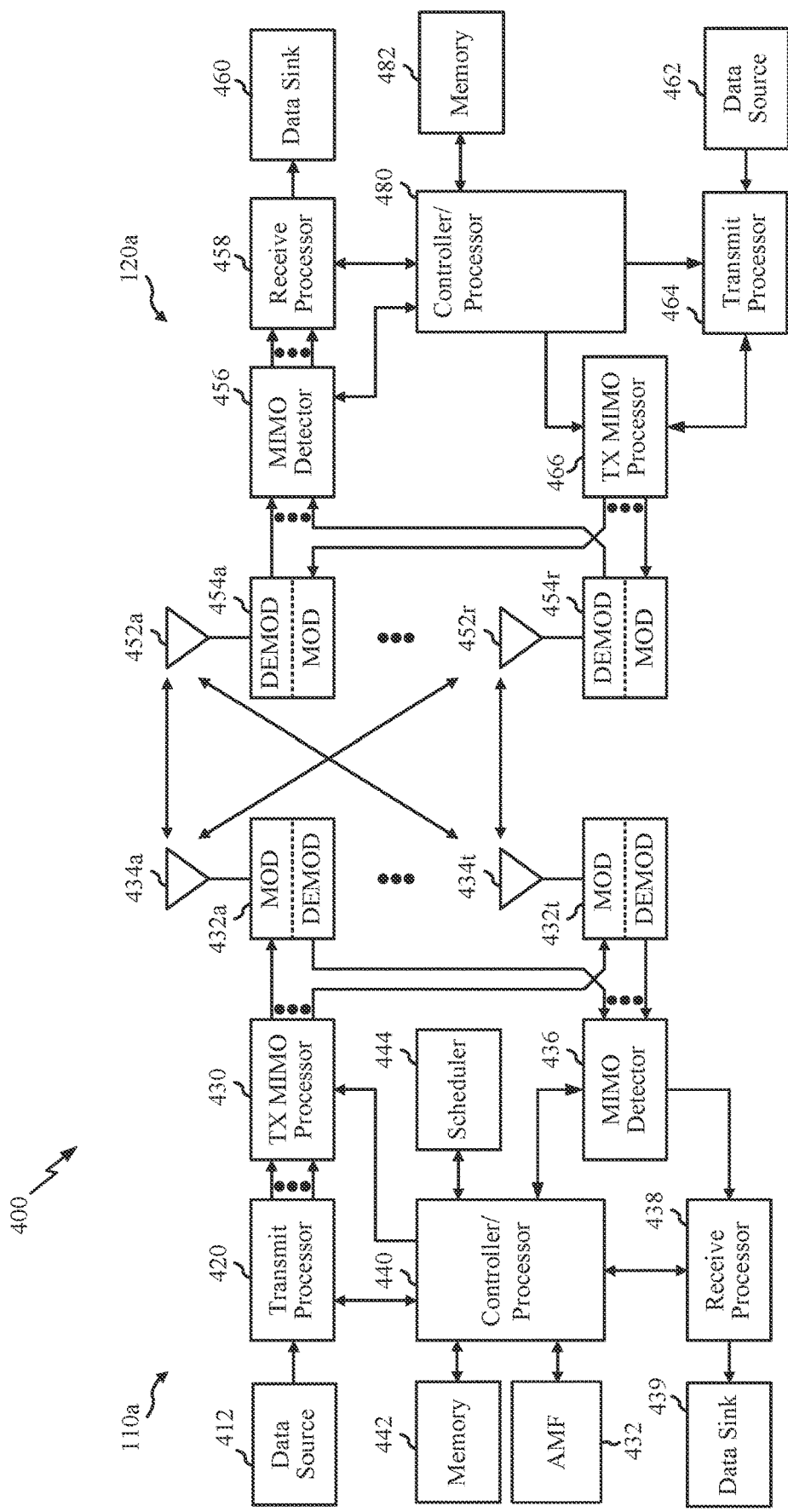
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a may be used to perform the various techniques and methods described herein with reference to FIG. 7. Similarly, antennas 434, processors 420, 438, 430, and/or controller/processor 440 of the BS 110a may be used to perform the various techniques and methods described herein with reference to FIG. 6.

At the BS 110a, a transmit processor 420 may receive data from a data source 412 and control information from a controller/processor 440. The control information may be for the physical broadcast channel (PBCH), physical control format indicator channel (PCFICH), physical hybrid-automatic-repeat-request (HARQ) indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the downlink, sidelink, and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example Adding A-DMRS for PUSCH

Aspects of the present disclosure provide techniques that allow for dynamically changing DMRS configuration by adding an additional-DMRS (A-DMRS) to counter changes in channel conditions that warrant additional support for channel estimation. The A-DMRS may add support to channel estimation in addition to DMRS indicated in the current DMRS configuration. DMRS configurations that are set via RRC are not impacted. The resource block (RB) allocation and the power of the A-DMRS may be decoupled from the PUSCH or DMRS already configured. The A-DMRS may extend for a long set of RBs.

As will be described in detail below, a UE may receive, from a network entity, signaling that triggers the UE to transmit A-DMRS for a PUSCH transmission, relative to DMRS indicated in a current PUSCH DMRS configuration. The UE may transmit at least one PUSCH including the A-DMRS.

As will also be described in detail, the network entity may detect at least one condition related to a channel between the network entity and the UE. The network may trigger, based on the detection, the UE to transmit A-DMRS for a PUSCH transmission relative to DMRS indicated in a current PUSCH DMRS configuration. The network may monitor for a PUSCH transmission from the UE including the A-DMRS.

FIG. 5 illustrates an example PUSCH configuration information element 500. The PUSCH configuration information element 500 may be sent between a base transceiver station and a UE. As illustrated, UE specific DMRS configurations are set via such information element. The network requires the DMRS to decode PUSCH.

Changing such a DMRS configuration via radio resource control (RRC) configuration (or reconfiguration) may be too slow to address rapidly changing channel conditions. By dynamically changing DMRS configuration by triggering A-DMRS, aspects of the present disclosure may be able to counter changes in channel conditions that warrant additional resources for channel estimation.

Figure 6:
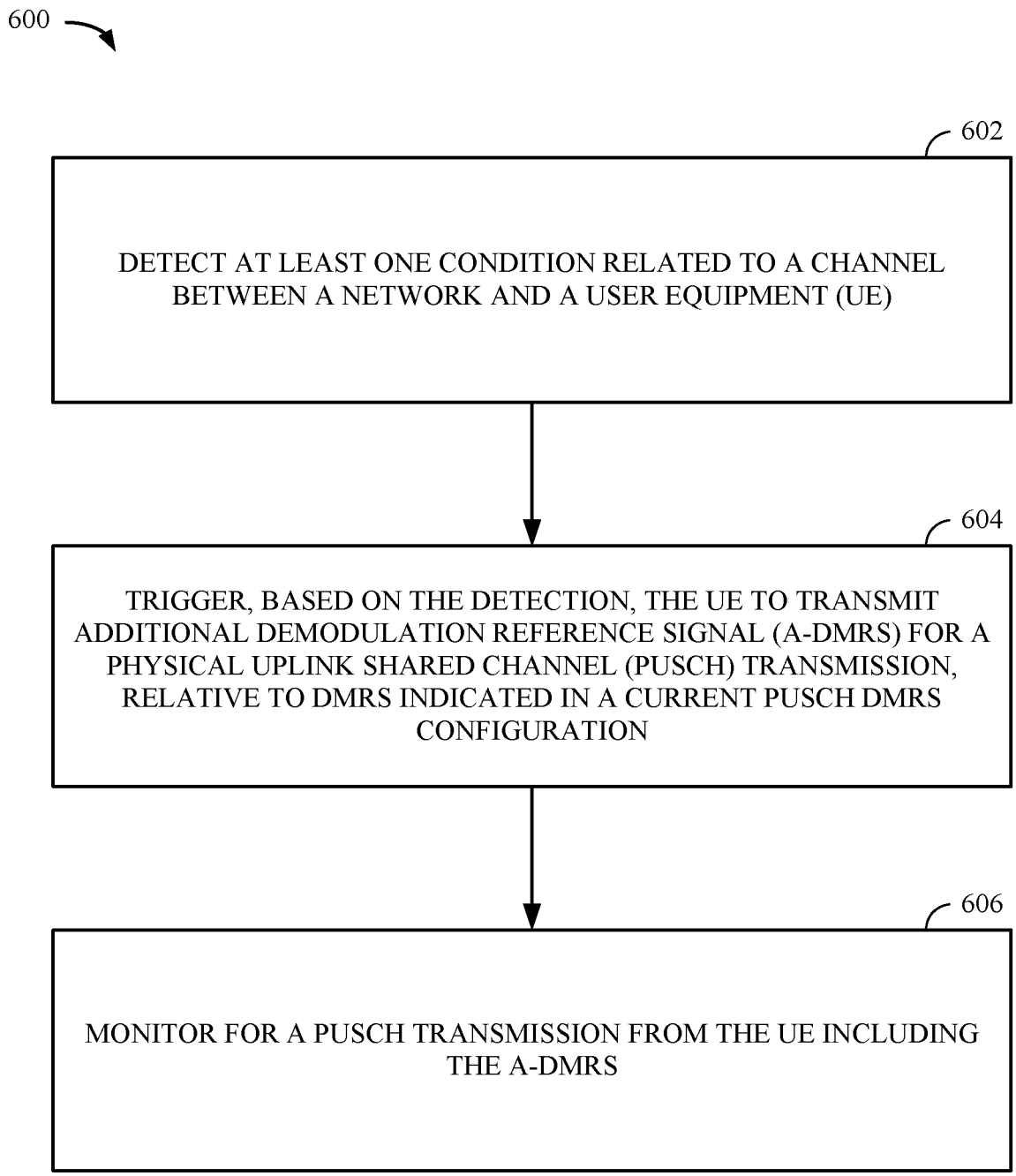
FIG. 6 illustrates example operations for wireless communications by a network entity, in accordance with certain aspects of the present disclosure.

FIGS. 6 and 7 illustrate example operations that a network entity (e.g., a gNB) and UE, respectively, may perform for dynamic A-DMRS.

FIG. 6 illustrates example operations 600 for wireless communications by a network entity, in accordance with certain aspects of the present disclosure. For example, operations 600 may be performed by a wireless network entity (which could be a base station 110 of FIG. 1 or 4).

Operations 600 begin, at 602, by detecting at least one condition related to a channel between the network entity and a UE. The at least one condition related to the wireless channel may relate to signal attenuation, delay, and/or phase shift, among others. Various reflectors that bounce radio signals may create multiple paths between the network entity and the UE, especially when the UE may change its position relative to the network entity. Constructive or destructive interference may occur for the same transmission travelling different paths, thus amplifying or attenuating the signal power observed at the UE. For example, deep fade, or strong destructive interference, may cause temporary communication failure due to a sudden drop in the signal-to-noise ratio.

At 604, the network entity may trigger, based on the detection, the ULE to transmit A-DMRS for a PUSCH transmission, relative to DMRS indicated in a current PUSCH DMRS configuration. At 606, the network entity may monitor for a PUSCH transmission from the UE including the A-DMRS.

FIG. 7 illustrates example operations 700 for wireless communications by a UE that may be considered complementary to operations 600 of FIG. 6. For example, operations 700 may be performed by a UE 120 (e.g., of FIG. 1 or FIG. 4) to transmit a PUSCH with A-DMRS, triggered by a gNB (performing operations 600 of FIG. 6). Operations 700 begin, at 702, by receiving from a network entity, signaling that triggers the UE to transmit additional demodulation reference signal (A-DMRS) for a physical uplink shared channel (PUSCH) transmission, relative to DMRS indicated in a current PUSCH DMRS configuration. At 704, the UE transmits at least one PUSCH including the A-DMRS. Various aspects of the A-DMRS have been discussed above.

Figure 8:
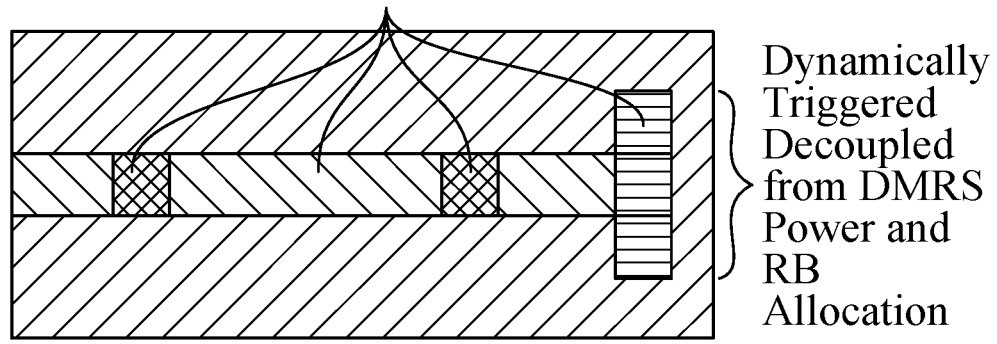
FIG. 8 illustrates an example additional demodulation reference signal (A-DMRS), in accordance with certain aspects of the present disclosure.

FIG. 8 illustrates an example of A-DMRS using wider bandwidth than allocated for PUSCH or (configured) DMRS. The current PUSCH DMRS configuration has been signaled via radio resource control (RRC) signaling and are not impacted or affected by triggering the A-DMRS. For example, in FIG. 8, the 10 PUSCH and 2 DMRS are not impacted by the A-DMRS. The A-DMRS may be dynamically triggered and decoupled from DMRS power and resource block (RB) allocation.

In some aspects, the A-DMRS may be dynamically triggered via at least one of a downlink control information (DCI) or a medium access control (MAC) control element (CE). In some cases, the A-DMRS is applied a certain number of slots after transmission of the DCI or MAC CE. For example, a clear timeline is indicated or specified on the earliest slot in which A-DMRS transmission begins. The A-DMRS may be triggered for one or more uplink slots. The DCI or MAC CE may indicate the number of uplink slots for which the A-DMRS is triggered. For example, A-DMRS may be aperiodically triggered via the DCI carrying the uplink grant. The trigger may be for a single slot or a set of a number of uplink slots, or until the UE asks to stop transmitting A-DMRS.

In alternative aspects, the number of uplink slots for which the A-DMRS is triggered may be indicated in a configuration signaled via RRC signaling. For example, the configurations for A-DMRS may have already been communicated via RRC signally but not triggered. The trigger that activates A-DMRS may then be sent via DCI.

Figure 9A:
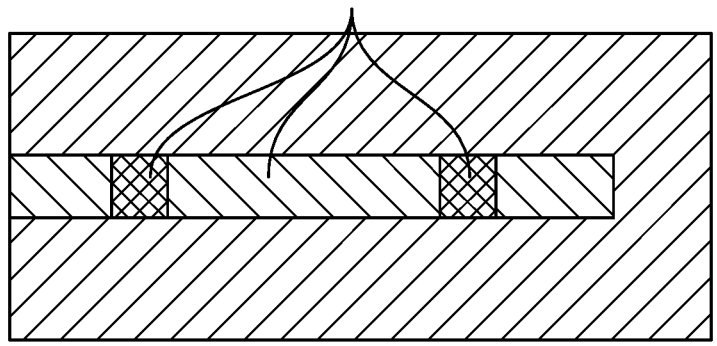
FIG. 9A illustrates a PUSCH transmission and FIG. 9B illustrates an example A-DMRS added to the PUSCH transmission, in accordance with certain aspects of the present disclosure.
Figure 9B:
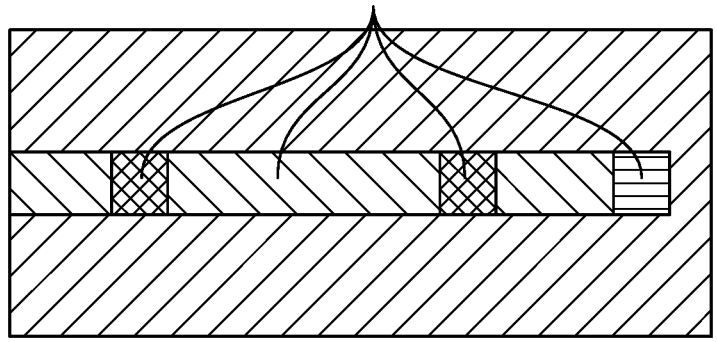

For example, FIG. 9A illustrates a PUSCH transmission before including the A-DMRS; and FIG. 9B illustrates an example of A-DMRS dynamically added to the PUSCH transmission. In the illustrated example, A-DMRS bandwidth spans resource blocks (RBs) of a symbol at an end of the PUSCH resources. The A-DMRS may occupy one or more symbols not allocated for PUSCH or for the DMRS indicated in the current DMRS configuration.

As shown in the example A-DMRS in FIG. 8 (as an alternative option to the A-DMRS shown in FIG. 9B), the A-DMRS may span a larger bandwidth than at least one of PUSCH or the DMRS indicated in the current DMRS configuration. As in the illustrated example, the bandwidth of the A-DMRS may be centered around the bandwidth allocated for at least one of the PUSCH or the DMRS indicated in the current DMRS configuration, such as having on additional RB allocation around the PUSCH RB shown in FIG. 8.

In certain aspects, the A-DMRS is limited to a certain number of RBs. For example, the certain number of RBs depends at least in part on a number of RBs allocated for PUSCH. In other aspects, the A-DMRS may be limited to certain RBs from an edge of a transmission band. The A-DMRS may be triggered when, or only when, a number of RBs allocated for PUSCH is at or below a threshold value.

The A-DMRS may have the following properties. The A-DMRS shares at least one of: a same antenna port, quasi co location (QCL) assumptions, or uplink spatial filters with the PUSCH. The A-DMRS is coherent in phase with the rest of the PUSCH and DMRS symbols. The A-DMRS is transmitted at the same transmit power as the PUSCH and DMRS to ensure phase coherence.

In some instances, the A-DMRS may span a wider bandwidth than the PUSCH (as shown in the example of FIG. 8). As such, the network entity may use the A-DMRS for power-delay-profile estimation of the channel. For example, the RBs allocated to the A-DMRS may have a partial overlap with the PUSCH, or may not even overlap with the PUSCH. For example, when the A-DMRS is used for power-delay profile estimation of the channel, the A-DMRS does not overlap with the PUSCH.

In some aspects, the location in time of the A-DMRS may be the OFDM symbol subsequent to the end of the PUSCH transmission or can be explicitly specified. The A-DMRS may have a range of frequency implicitly determined based on resources of the PUSCH and a scaling factor that is greater than or equal to 1. In some cases, the A-DMRS is centered around the allocation for PUSCH.

In some cases, a sounding reference signal (SRS) can be repurposed as the A-DMRS. For example, the A-DMRS may be sent using aperiodic SRS configured for the UE with a use case that indicates A-DMRS. The use case that indicates A-DMRS may be in addition to other use cases indicated by the SRS, such as beam management, codebook, noncodebook, or antenna switching. The A-DMRS sent using A-DMRS resources may be generated using an SRS sequence. For example, the SRS may use the same antenna port, QCL, and uplink spatial filters as PUSCH in the same slot and behave like a DMRS. The A-DMRS in this case may use the SRS sequence and follow the procedure used to construct the SRS waveform, or alternatively, follow the procedure used to generate the DMRS waveform.

The A-DMRS may resolve conflicts with SRS using the following priority rules. Because the A-DMRS may be triggered dynamically via DCI, the A-DMRS may collide with another channel transmission, including SRS. The network entity may determine priority handling when a collision between resources of the triggered A-DMRS and resources for another uplink transmission. For example, the priority handling may be based on at least one of a relative number of scheduled transmissions for the A-DMRS and the other uplink transmission; or a type of information conveyed in the uplink transmission. The A-DMRS may take higher priority over SRS when the A-DMRS transmission is triggered dynamically via DCI. If, on the other hand, SRS occurs sporadically, or with a much longer periodicity than the A-DMRS, and if the A-DMRS is triggered for a certain number of contiguous slots, then the SRS may take a higher priority than the A-DMRS. In some other examples, if the A-DMRS collides with a PUCCH carrying periodic channel status information (CSI), then the A-DMRS may take precedence.

In some cases, the UE is allowed to multiplex one or more other uplink transmissions in the same symbol as A-DMRS. For example, it may be possible to multiplex multiple channels on the same symbol when there is a separation in frequency or allocated RBs.

Figure 9C:
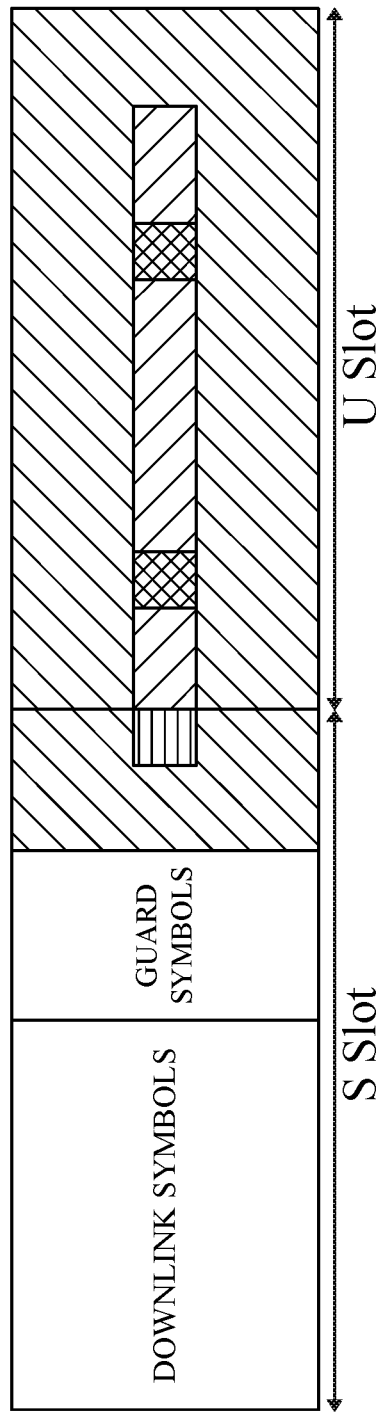
FIG. 9C illustrates an example of an A-DMRS preceding a PUSCH transmission and located in a different slot, in accordance with certain aspects of the present disclosure.

FIG. 9C illustrates an example of an A-DMRS preceding a PUSCH transmission and located in a different slot, in accordance with certain aspects of the present disclosure. As shown, the A-DMRS is in a different, adjacent slot (the S Slot) next to the U Slot having data and two DMRS. The S slot includes downlink symbols and guard symbols before transitioning to the uplink symbols having the A-DMRS. Such configuration may be used for joint channel estimation once DMRS bundling across slots is enabled.

Figure 9D:
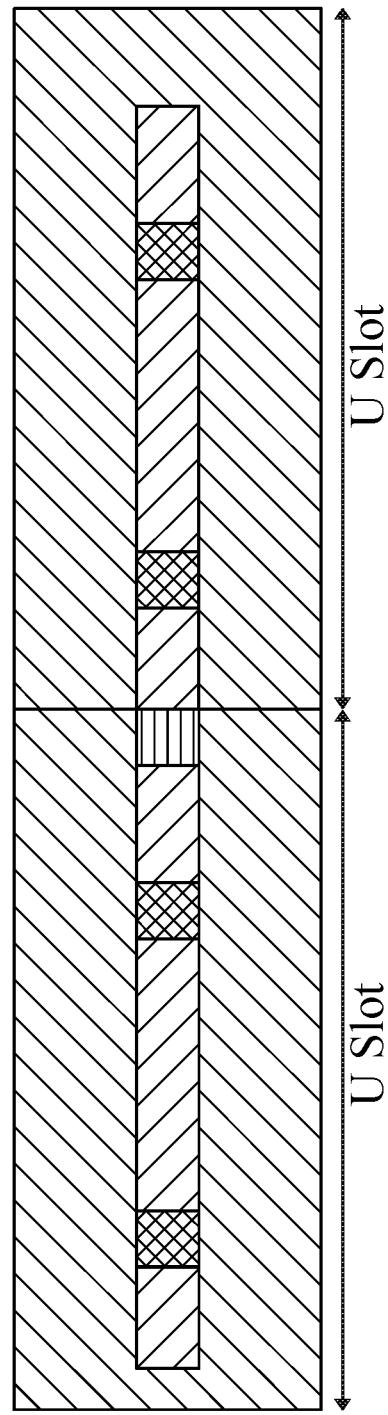
FIG. 9D illustrates an example of an A-DMRS preceding a PUSCH transmission and located in the middle of two PUSCH transmissions, in accordance with certain aspects of the present disclosure.

FIG. 9D illustrates an example of an A-DMRS preceding a PUSCH transmission and located in the middle of two PUSCH transmissions, in accordance with certain aspects of the present disclosure. As shown, the A-DMRS may be in the middle of two PUSCH transmissions or repetitions to bridge the gap between the transmissions. The A-DMRS may serve as a common DMRS to the PUSCH transmissions/repetitions. The A-DMRS may alternatively be used towards a joint channel estimation with DMRS bundling.

Figure 10:
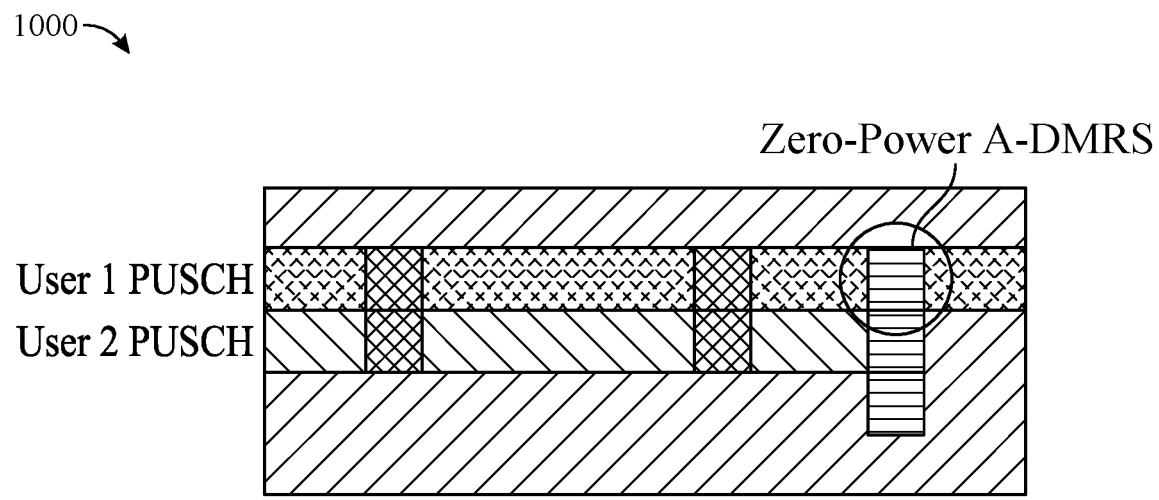
FIG. 10 illustrates an example zero-power A-DMRS, in accordance with certain aspects of the present disclosure.

In multi-user uplink scenarios, zero-power A-DMRS may be transmitted for rate matching PUSCH of multiple users. In such cases, the network entity may signal one or more other UEs, frequency division multiplexed with the UE, regarding the presence of the A-DMRS. The signaling may indicate the other UE is to at least temporarily transmit zero power in A-DMRS in resource allocated for the triggered A-DMRS. For example, FIG. 10 illustrates an example zero-power A-DMRS. In FIG. 10, the inclusion of the zero-power A-DMRS may enable rate matching for the FDM'd UEs.

Figure 11:
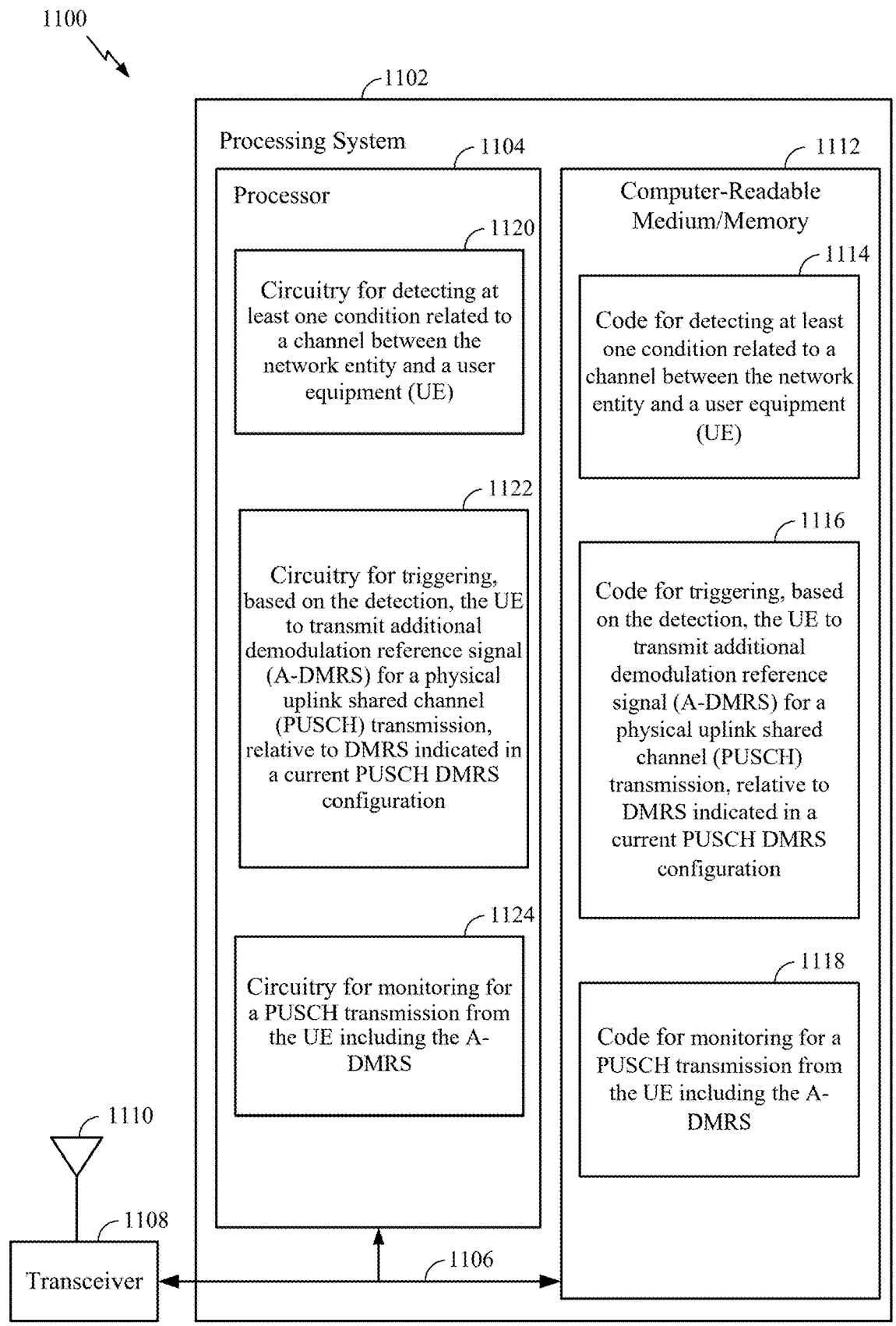
FIG. 11 illustrates a communications device that may include various components configured to perform the operations illustrated in FIG. 6, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIG. 6. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6. In certain aspects, computer-readable medium/memory 1112 stores code 1114 for detecting at least one condition related to a channel between the network entity and a user equipment (UE); code 1116 for triggering, based on the detection, the UE to transmit additional demodulation reference signal (A-DMRS) for a physical uplink shared channel (PUSCH) transmission, relative to DMRS indicated in a current PUSCH DMRS configuration; and code 1118 for monitoring for a PUSCH transmission from the UE including the A-DMRS. In certain aspects, the processor 1104 has circuitry configured to implement the code stored in the computer-readable medium/memory 1112. The processor 1104 includes circuitry 1120 for detecting at least one condition related to a channel between the network entity and a user equipment (UE); circuitry 1122 for triggering, based on the detection, the UE to transmit additional demodulation reference signal (A-DMRS) for a physical uplink shared channel (PUSCH) transmission, relative to DMRS indicated in a current PUSCH DMRS configuration; and circuitry 1124 for monitoring for a PUSCH transmission from the UE including the A-DMRS.

Figure 12:
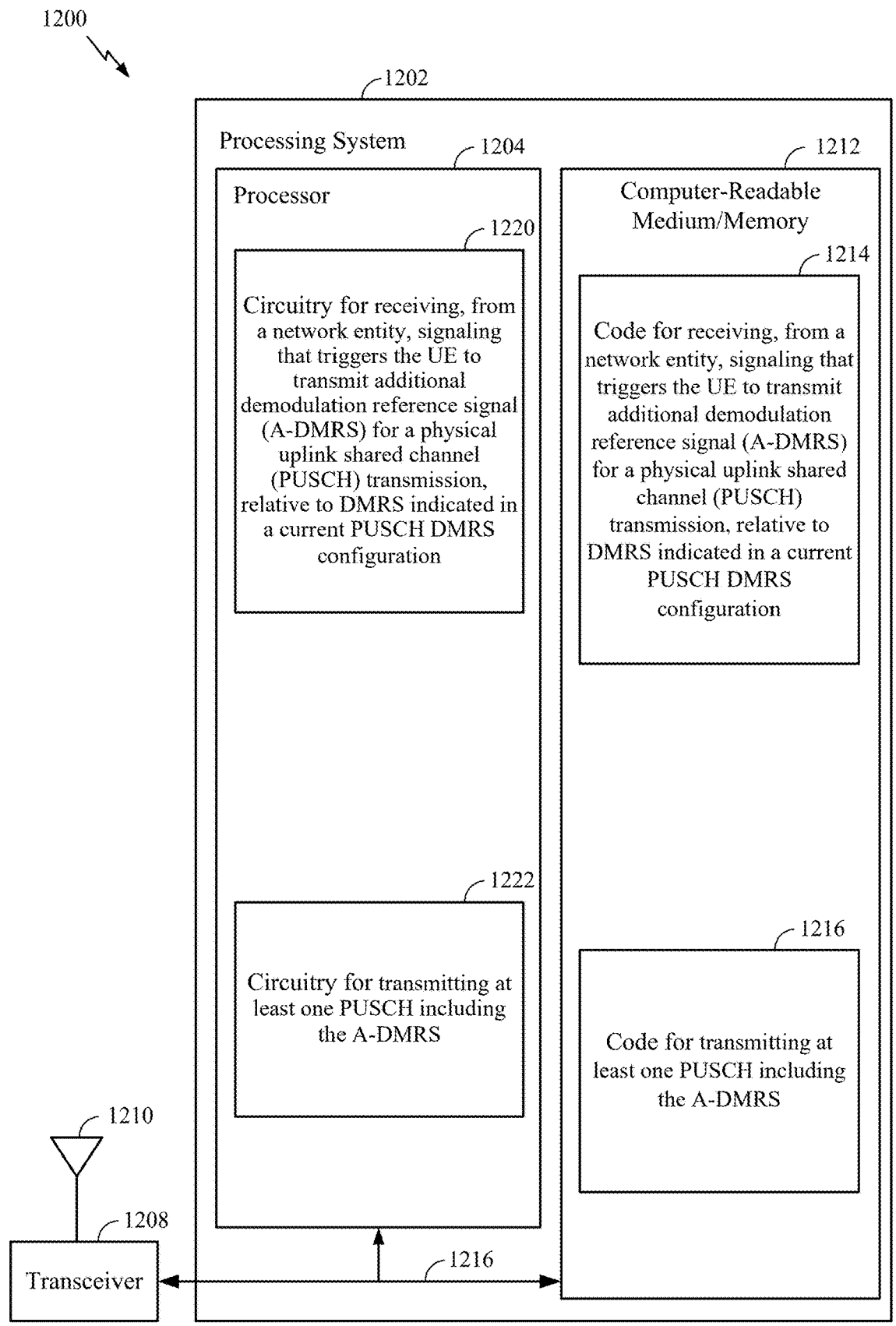
FIG. 12 illustrates a communications device that may include various components configured to perform the operations illustrated in FIG. 7, in accordance with certain aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7. In certain aspects, computer-readable medium/memory 1212 stores code 1214 for receiving, from a network entity, signaling that triggers the UE to transmit additional demodulation reference signal (A-DMRS) for a physical uplink shared channel (PUSCH) transmission, relative to DMRS indicated in a current PUSCH DMRS configuration; and code 1216 for transmitting at least one PUSCH including the A-DMRS. In certain aspects, the processor 1204 has circuitry configured to implement the code stored in the computer-readable medium/memory 1212. The processor 1204 includes circuitry 1220 for receiving, from a network entity, signaling that triggers the UE to transmit additional demodulation reference signal (A-DMRS) for a physical uplink shared channel (PUSCH) transmission, relative to DMRS indicated in a current PUSCH DMRS configuration; and circuitry 1222 for transmitting at least one PUSCH including the A-DMRS.

Example Aspects

Aspect 1: A method for wireless communications by a user equipment (UE), comprising: receiving, from a network entity, signaling that triggers the UE to transmit additional demodulation reference signal (A-DMRS) for a physical uplink shared channel (PUSCH) transmission, relative to DMRS indicated in a current PUSCH DMRS configuration; and transmitting at least one PUSCH including the A-DMRS.

Aspect 2: The method of Aspect 1, wherein: the current PUSCH DMRS configuration was signaled via radio resource control (RRC) signaling; and the DMRS indicated in the current DMRS configuration are not impacted by triggering the A-DMRS.

Aspect 3: The method of Aspect 1 or 2, wherein the A-DMRS occupies one or more symbols not allocated for PUSCH or for the DMRS indicated in the current DMRS configuration.

Aspect 4: The method of any one of Aspects 1 to 3, wherein the A-DMRS spans a larger bandwidth than at least one of PUSCH or the DMRS indicated in the current DMRS configuration.

Aspect 5: The method of Aspect 4, wherein a bandwidth of the A-DMRS is centered around bandwidth allocated for at least one of the PUSCH or the DMRS indicated in the current DMRS configuration.

Aspect 6: The method of Aspect 4, wherein the A-DMRS is limited to a certain number of resource blocks (RBs).

Aspect 7: The method of Aspect 6, wherein the certain number of RBs depends at least in part on a number of RBs allocated for PUSCH.

Aspect 8: The method of Aspect 4, wherein the A-DMRS is limited to certain resource blocks (RBs) from an edge of a transmission band.

Aspect 9: The method of Aspect 4, wherein the A-DMRS is triggered only when a number of resource blocks (RBs) allocated for PUSCH is at or below a threshold value.

Aspect 10: The method of Aspect 1, wherein the A-DMRS is triggered via at least one of: a downlink control information (DCI) or a medium access control (MAC) control element (CE).

Aspect 11: The method of Aspect 10, wherein the A-DMRS is applied a certain number of slots after transmission of the DCI or MAC CE.

Aspect 12: The method of Aspect 10, wherein the A-DMRS is triggered for one or more uplink slots.

Aspect 13: The method of Aspect 12, wherein the DCI or MAC-CE indicates the number of uplink slots for which the A-DMRS is triggered.

Aspect 14: The method of Aspect 12, wherein the number of uplink slots for which the A-DMRS is triggered is indicated in a configuration signaled via radio resource control (RRC) signaling.

Aspect 15: The method of Aspect 1, wherein the A-DMRS shares at least one of: a same antenna port, quasi co location (QCL) assumptions, or uplink spatial filters with the PUSCH.

Aspect 16: The method of Aspect 1, wherein the A-DMRS is transmitted at a same transmit power as the PUSCH and the DMRS indicated in the PUSCH DMRS configuration.

Aspect 17: The method of Aspect 1, wherein the A-DMRS spans a wider bandwidth than the PUSCH.

Aspect 18: The method of Aspect 1, further comprising implicitly determining a bandwidth of the A-DMRS based on resources of the PUSCH and a scaling factor that is greater than or equal to 1.

Aspect 19: The method of Aspect 1, wherein the A-DMRS is sent using aperiodic sounding reference signal (A-SRS) resources configured for the UE with a use case that indicates A-DMRS.

Aspect 20: The method of Aspect 19, wherein the A-DMRS sent using A-DMRS resources is generated using an SRS sequence.

Aspect 21: The method of Aspect 1, further comprising determining priority handling when a collision between resources of the triggered A-DMRS and resources for another uplink transmission.

Aspect 22: The method of Aspect 21, wherein the priority handling is based at least one of: a relative number of scheduled transmissions for the A-DMRS and the other uplink transmission; or a type of information conveyed in the uplink transmission.

Aspect 23: The method of Aspect 1, further comprising multiplexing one or more other uplink transmissions in a same symbol as A-DMRS.

Aspect 24: The method of Aspect 1, further comprising: receiving signaling, from the network entity, regarding presence of the A-DMRS from another UE; and at least temporarily transmitting zero power in A-DMRS resources indicated in the signaling as used by the other UE.

Aspect 25: The method of Aspect 1, wherein transmitting at least one PUSCH including the A-DMRS comprises transmitting the at least one PUSCH in at least two slots, and wherein the A-DMRS is located in a different slot adjacent to a slot of the PUSCH.

Aspect 26: The method of Aspect 25, wherein the at least one PUSCH in the at least two slots comprises two PUSCH repetitions.

Aspect 27: A method for wireless communications by a network entity, comprising: detecting at least one condition related to a channel between the network entity and a user equipment (UE); triggering, based on the detection, the UE to transmit additional demodulation reference signal (A-DMRS) for a physical uplink shared channel (PUSCH) transmission, relative to DMRS indicated in a current PUSCH DMRS configuration; and monitoring for a PUSCH transmission from the UE including the A-DMRS.

Aspect 28: The method of Aspect 26, wherein: the current PUSCH DMRS configuration was signaled via radio resource control (RRC) signaling; and the DMRS indicated in the current DMRS configuration are not impacted by triggering the A-DMRS.

Aspect 29: The method of Aspect 26, wherein: the current PUSCH DMRS configuration was signaled via radio resource control (RRC) signaling; and the DMRS indicated in the current DMRS configuration are not impacted by triggering the A-DMRS.

Aspect 30: The method of Aspect 26, wherein the A-DMRS occupies one or more symbols not allocated for PUSCH or for the DMRS indicated in the current DMRS configuration.

Aspect 31: The method of Aspect 26, wherein the A-DMRS spans a larger bandwidth than at least one of PUSCH or the DMRS indicated in the current DMRS configuration.

Aspect 32: The method of Aspect 31, wherein a bandwidth of the A-DMRS is centered around bandwidth allocated for at least one of the PUSCH or the DMRS indicated in the current DMRS configuration.

Aspect 33: The method of Aspect 31, wherein the A-DMRS is limited to a certain number of resource blocks (RBs).

Aspect 34: The method of Aspect 32, wherein the certain number of RBs depends at least in part on a number of RBs allocated for PUSCH.

Aspect 35: The method of Aspect 30, wherein the A-DMRS is limited to certain resource blocks (RBs) from an edge of a transmission band.

Aspect 36: The method of Aspect 30, wherein the A-DMRS is triggered only when a number of resource blocks (RBs) allocated for PUSCH is at or below a threshold value.

Aspect 37: The method of Aspect 27, wherein the A-DMRS is triggered via at least one of: a downlink control information (DCI) or a medium access control (MAC) control element (CE).

Aspect 38: The method of Aspect 37, wherein the A-DMRS is applied a certain number of slots after transmission of the DCI or MAC CE.

Aspect 39: The method of Aspect 37, wherein the A-DMRS is triggered for one or more uplink slots.

Aspect 40: The method of Aspect 39, wherein the DCI or MAC-CE indicates the number of uplink slots for which the A-DMRS is triggered.

Aspect 41: The method of Aspect 39, wherein the number of uplink slots for which the A-DMRS is triggered is indicated in a configuration signaled via radio resource control (RRC) signaling.

Aspect 42: The method of Aspect 27, wherein the A-DMRS shares at least one of: a same antenna port, quasi co location (QCL) assumptions, or uplink spatial filters with the PUSCH.

Aspect 43: The method of Aspect 27, wherein the A-DMRS is transmitted at a same transmit power as the PUSCH and the DMRS indicated in the PUSCH DMRS configuration.

Aspect 44: The method of Aspect 27, wherein the A-DMRS spans a wider bandwidth than the PUSCH.

Aspect 45: The method of Aspect 44, wherein: the network entity uses the A-DMRS for power-delay-profile (PDP) estimation of the channel.

Aspect 46: The method of Aspect 27, wherein the A-DMRS has a range of frequency implicitly determined based on resources of the PUSCH and a scaling factor that is greater than or equal to 1.

Aspect 47: The method of Aspect 27, wherein the A-DMRS is sent using aperiodic sounding reference signal (A-SRS) resources configured for the UE with a use case that indicates A-DMRS.

Aspect 48: The method of Aspect 47, wherein the A-DMRS sent using A-DMRS resources is generated using an SRS sequence.

Aspect 49: The method of Aspect 27, further comprising determining priority handling when a collision between resources of the triggered A-DMRS and resources for another uplink transmission.

Aspect 50: The method of Aspect 49, wherein the priority handling is based at least one of: a relative number of scheduled transmissions for the A-DMRS and the other uplink transmission; or a type of information conveyed in the uplink transmission.

Aspect 51: The method of Aspect 27, wherein, the UE is allowed to multiplex one or more other uplink transmissions in a same symbol as A-DMRS.

Aspect 52: The method of Aspect 27, further comprising: signaling at least one other UE, frequency division multiplexed with the UE, regarding presence of the A-DMRS.

Aspect 53: The method of Aspect 52, wherein the signaling comprises signaling the other UE to at least temporarily transmit zero power in A-DMRS in resource allocated for the triggered A-DMRS.

Aspect 54: An apparatus for wireless communications by a user equipment (UE), comprising: a memory; and at least one processor coupled to the memory, the at least one processor configured to: receive, from a network entity, signaling that triggers the UE to transmit additional demodulation reference signal (A-DMRS) for a physical uplink shared channel (PUSCH) transmission, relative to DMRS indicated in a current PUSCH DMRS configuration; and transmit at least one PUSCH including the A-DMRS.

Aspect 55: An apparatus for wireless communications by a network entity, comprising: a memory; and at least one processor coupled to the memory, the at least one processor configured to: detect at least one condition related to a channel between the network entity and a user equipment (UE); trigger, based on the detection, the UE to transmit additional demodulation reference signal (A-DMRS) for a physical uplink shared channel (PUSCH) transmission, relative to DMRS indicated in a current PUSCH DMRS configuration; and monitor for a PUSCH transmission from the UE including the A-DMRS.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 7, 8 and/or 9 may be performed by various processors shown in FIG. 4 for UE 120*a* and/or BS 110*a*.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes, and variations may be made in the arrangement, operation, and details of the methods and apparatus described above without departing from the scope of the claims.

What is claimed is:

1. A method for wireless communications by a user equipment (UE), comprising:
   receiving, from a network entity, signaling that triggers the UE to transmit additional demodulation reference signal (A-DMRS) for at least one physical uplink shared channel (PUSCH), relative to DMRS indicated in a current PUSCH DMRS configuration; and
   transmitting the at least one PUSCH including the A-DMRS, wherein the A-DMRS is triggered only when a number of resource blocks (RBs) allocated for the at least one PUSCH is at or below a threshold value.

2. The method of claim 1, wherein:
   the current PUSCH DMRS configuration was signaled via radio resource control (RRC) signaling; and
   the DMRS indicated in the current DMRS configuration are not impacted by triggering the A-DMRS.

3. The method of claim 1, wherein the A-DMRS occupies one or more symbols not allocated for the at least one PUSCH or for the DMRS indicated in the current DMRS configuration.

4. The method of claim 1, wherein the A-DMRS spans a larger bandwidth than at least one of the DMRS indicated in the current DMRS configuration or the at least one PUSCH.

5. The method of claim 4, wherein a bandwidth of the A-DMRS is centered around bandwidth allocated for at least one of the DMRS indicated in the current DMRS configuration or the at least one PUSCH.

6. The method of claim 4, wherein the A-DMRS is limited to a number of resource blocks (RBs).

7. The method of claim 6, wherein the number of RBs depends at least in part on a number of RBs allocated for the at least one PUSCH.

8. The method of claim 4, wherein the A-DMRS is limited to resource blocks (RBs) from an edge of a transmission band.

9. The method of claim 1, wherein the A-DMRS is triggered via at least one of: a downlink control information (DCI) or a medium access control (MAC) control element (CE).

10. The method of claim 9, wherein the A-DMRS is applied a number of slots after transmission of the DCI or MAC CE.

11. The method of claim 9, wherein the A-DMRS is triggered for one or more uplink slots.

12. The method of claim 11, wherein the DCI or MAC-CE indicates the number of uplink slots for which the A-DMRS is triggered.

13. The method of claim 11, wherein the number of uplink slots for which the A-DMRS is triggered is indicated in a configuration signaled via radio resource control (RRC) signaling.

14. The method of claim 1, wherein the A-DMRS shares at least one of: a same antenna port, quasi co location (QCL) assumptions, or uplink spatial filters with the at least one PUSCH.

15. The method of claim 1, wherein the A-DMRS is transmitted at a same transmit power as the at least one PUSCH and the DMRS indicated in the PUSCH DMRS configuration.

16. The method of claim 1, wherein the A-DMRS spans a wider bandwidth than the at least one PUSCH.

17. The method of claim 1, further comprising implicitly determining a bandwidth of the A-DMRS based on resources of the at least one PUSCH and a scaling factor that is greater than or equal to 1.

18. The method of claim 1, wherein the A-DMRS is sent using aperiodic sounding reference signal (A-SRS) resources configured for the UE with a use case that indicates A-DMRS.

19. The method of claim 18, wherein the A-DMRS sent using A-DMRS resources is generated using an SRS sequence.

20. The method of claim 1, further comprising determining priority handling when a collision between resources of the triggered A-DMRS and resources for another uplink transmission.

21. The method of claim 20, wherein the priority handling is based at least one of:
   a relative number of scheduled transmissions for the A-DMRS and the other uplink transmission; or
   a type of information conveyed in the uplink transmission.

22. The method of claim 1, further comprising multiplexing one or more other uplink transmissions in a same symbol as A-DMRS.

23. The method of claim 1, further comprising:
   receiving signaling, from the network entity, regarding presence of the A-DMRS from another UE; and
   at least temporarily transmitting zero power in A-DMRS resources indicated in the signaling as used by the other UE.

24. The method of claim 1, wherein transmitting the at least one PUSCH including the A-DMRS comprises transmitting the at least one PUSCH in at least two slots, and wherein the A-DMRS is located in a different slot adjacent to a slot of the at least one PUSCH.

25. The method of claim 24, wherein the at least one PUSCH in the at least two slots comprises two PUSCH repetitions.

26. The method of claim 25, wherein:
   the current PUSCH DMRS configuration was signaled via radio resource control (RRC) signaling; and
   the DMRS indicated in the current DMRS configuration are not impacted by triggering the A-DMRS.

27. A method for wireless communications by a network entity, comprising:
   detecting at least one condition related to a channel between the network entity and a user equipment (UE);
   triggering, based on the detection, the UE to transmit additional demodulation reference signal (A-DMRS) for at least one physical uplink shared channel (PUSCH), relative to DMRS indicated in a current PUSCH DMRS configuration, wherein the A-DMRS is triggered only when a number of resource blocks (RBs) allocated for the at least one PUSCH is at or below a threshold value; and
   monitoring for the at least one PUSCH from the UE including the A-DMRS.

28. An apparatus for wireless communications by a user equipment (UE), comprising:
   a memory; and
   at least one processor coupled to the memory, the at least one processor configured to:
      receive, from a network entity, signaling that triggers the UE to transmit additional demodulation reference signal (A-DMRS) for at least one physical uplink shared channel (PUSCH) transmission, relative to DMRS indicated in a current PUSCH DMRS configuration; and transmit the at least one PUSCH including the A-DMRS, wherein the A-DMRS is triggered only when a number of resource blocks (RBs) allocated for the at least one PUSCH is at or below a threshold value.

29. An apparatus for wireless communications by a network entity, comprising:

a memory; and at least one processor coupled to the memory, the at least one processor configured to:

detect at least one condition related to a channel between the network entity and a user equipment (UE);

trigger, based on the detection, the UE to transmit additional demodulation reference signal (A-DMRS) for at least one physical uplink shared channel (PUSCH), relative to DMRS indicated in a current PUSCH DMRS configuration, wherein the A-DMRS is triggered only when a number of resource blocks (RBs) allocated for the at least one PUSCH is at or below a threshold value; and monitor for the at least one PUSCH from the UE including the A-DMRS.

* * * * *